US009529545B1

(12) United States Patent
Bono et al.

(10) Patent No.: US 9,529,545 B1
(45) Date of Patent: Dec. 27, 2016

(54) MANAGING DATA DEDUPLICATION IN STORAGE SYSTEMS BASED ON STORAGE SPACE CHARACTERISTICS

(71) Applicant: EMC Corporation, Hopkinton, MA (US)

(72) Inventors: Jean-Pierre Bono, Westborough, MA (US); Dennis T. Duprey, Raleigh, NC (US); Xiangping Chen, Sherborn, MA (US); Philippe Armangau, Acton, MA (US); Monica Chaudhary, South Grafton, MA (US); Mark K. Ku, Wollaston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 14/141,258

(22) Filed: Dec. 26, 2013

(51) Int. Cl.
G06F 12/00 (2006.01)
G06F 13/00 (2006.01)
G06F 13/28 (2006.01)
G06F 3/06 (2006.01)

(52) U.S. Cl.
CPC ........... *G06F 3/0641* (2013.01); *G06F 3/0619* (2013.01); *G06F 3/0689* (2013.01)

(58) Field of Classification Search
CPC ..... G06F 3/0641; G06F 3/0619; G06F 3/0689
See application file for complete search history.

(56) References Cited

U.S. PATENT DOCUMENTS

| 7,225,211 | B1 * | 5/2007 | Colgrove | G06F 17/30221 707/693 |
| 7,822,939 | B1 * | 10/2010 | Veprinsky | G06F 3/0608 711/161 |
| 7,949,637 | B1 * | 5/2011 | Burke | G06F 3/0605 707/655 |
| 8,209,506 | B2 * | 6/2012 | Yueh | G06F 3/0608 707/664 |
| 8,452,932 | B2 * | 5/2013 | Pangal | G06F 11/1453 711/162 |

(Continued)

OTHER PUBLICATIONS

Avoiding the Disk Bottleneck in the Data Domain Deduplication File System; Zhu et al; FAST '0 Proceedings of the 6th USENIX Conference on File and Storage Technologies, article No. 18; 2008; retrieved from https://www.usenix.org/legacy/event/fast08/tech/full_papers/zhu/zhu.pdf on Sep. 24, 2015 (14 pages).*

(Continued)

*Primary Examiner* — Daniel C Chappell
(74) *Attorney, Agent, or Firm* — Krishnendu Gupta; Jason A. Reyes; Deepika Bhayana

(57) ABSTRACT

A method is used in managing data deduplication in storage systems based on storage space characteristics. Characteristics of first and second storage tiers are evaluated. A first data object resides on the first storage tier and a second data object resides on the second storage tier. The first and second data objects are selected for applying a deduplicating technique. A data storage system includes the first and second storage tiers configured such that performance characteristics associated with the first storage tier is different from the second storage tier. Based on the evaluation, the deduplicating technique is applied to the first and second data objects.

14 Claims, 5 Drawing Sheets

(56) References Cited

U.S. PATENT DOCUMENTS

| | | | | |
|---|---|---|---|---|
| 8,539,165 | B2* | 9/2013 | Jaquette | G06F 17/30221 707/661 |
| 8,555,018 | B1* | 10/2013 | Rohr | G06F 3/0605 707/758 |
| 8,566,549 | B1* | 10/2013 | Burke | G06F 3/0611 711/114 |
| 8,583,607 | B1* | 11/2013 | Chen | G06F 3/0641 707/692 |
| 8,838,887 | B1* | 9/2014 | Burke | G06F 3/0611 711/112 |
| 8,935,493 | B1* | 1/2015 | Dolan | G06F 3/0649 711/117 |
| 8,949,208 | B1* | 2/2015 | Xu | G06F 3/0641 707/661 |
| 8,965,856 | B2* | 2/2015 | Kawaguchi | G06F 3/0608 707/693 |
| 9,342,253 | B1* | 5/2016 | Muthukkaruppan | G06F 3/0641 |
| 2011/0167221 | A1* | 7/2011 | Pangal | G06F 11/1453 711/117 |
| 2012/0124306 | A1* | 5/2012 | Abercrombie | G06F 11/1461 711/162 |
| 2013/0159648 | A1* | 6/2013 | Anglin | G06F 11/1453 711/162 |
| 2013/0238832 | A1* | 9/2013 | Dronamraju | G06F 3/0608 711/103 |
| 2014/0059311 | A1* | 2/2014 | Oberhofer | G06F 3/061 711/162 |
| 2014/0095790 | A1* | 4/2014 | Chambliss | G06F 12/0897 711/117 |
| 2014/0229675 | A1* | 8/2014 | Aizman | G06F 3/0608 711/117 |
| 2014/0310455 | A1* | 10/2014 | Baldwin | G06F 3/0641 711/114 |

OTHER PUBLICATIONS

SAM: A Semantic-Aware Multi-tiered Source De-duplication Framework for Cloud Backup; Tan et al; 39th International Conference on Parallel Processing (ICPP); Sep. 13-16, 2010; pp. 614-623 (10 pages).*

SAFE: A Source Deduplication Framework for Efficient Cloud Backup Services; Tan et al; Journal of Signal Processing Systems, vol. 72; published online Jun. 21, 2013; retrieved from http://link.springer.com/article/10.1007%2Fs11265-013-0775-x on Sep. 24, 2015; pp. 209-228 (20 pages).*

Multi-Level DASD Array Storage System; IBM Technical Disclosure Bulletin NN950623 ; Jun. 1995 (2 pages).*

Definition of logical unit number (LUN); SearchStorage TechTarget; Feb. 25, 2012; retrieved from https://web.archive.org/web/20120225125342/http://searchstorage.techtarget.com/definition/logical-unit-number on Sep. 25, 2015 (1 page).*

Definition of Raid; Webopedia; Jan. 1, 2012; retrieved from https://web.archive.org/web/20120101064404/http://www.webopedia.com/TERM/R/RAID.html on Sep. 24, 2015 (2 pages).*

Purity: Building Fast, Highly-Available Enterprise Flash Storage from Commodity Components; Colgrove et al; Proceedings of the 2015 ACM SIGMOD International Conference on Management of Data ; May 27, 2015; pp. 1683-1694 (12 pages).*

* cited by examiner

MANAGING DATA DEDUPLICATION IN STORAGE SYSTEMS BASED ON STORAGE SPACE CHARACTERISTICS

CROSS REFERENCE TO RELATED APPLICATIONS

This application is related to co-pending U.S. patent application Ser. No. 14/141,287 entitled MANAGING DATA DEDUPLICATION IN STORAGE SYSTEMS filed on Dec. 26, 2013, and U.S. patent application Ser. No. 14/141,221 entitled MANAGING DATA DEDUPLICATION IN STORAGE SYSTEMS BASED ON I/O ACTIVITIES filed on Dec. 26, 2013, which is incorporated herein by reference.

BACKGROUND

Technical Field

This application relates to managing data deduplication in storage systems based on storage space characteristics.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Deduplication is a space-saving technology intended to eliminate redundant (duplicate) data (such as, files) on a data storage system. By saving only one instance of a file, disk space can be significantly reduced. For example, a file of size 10 megabytes (MB) may be stored in ten folders of each employee in an organization that has ten employees. Thus, in such a case, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges, especially when managing the process of mapping data objects selected for deduplication.

SUMMARY OF THE INVENTION

A method is used in managing data deduplication in storage systems based on storage space characteristics. Characteristics of first and second storage tiers are evaluated. A first data object resides on the first storage tier and a second data object resides on the second storage tier. The first and second data objects are selected for applying a deduplicating technique. A data storage system includes the first and second storage tiers configured such that performance characteristics associated with the first storage tier is different from the second storage tier. Based on the evaluation, the deduplicating technique is applied to the first and second data objects.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
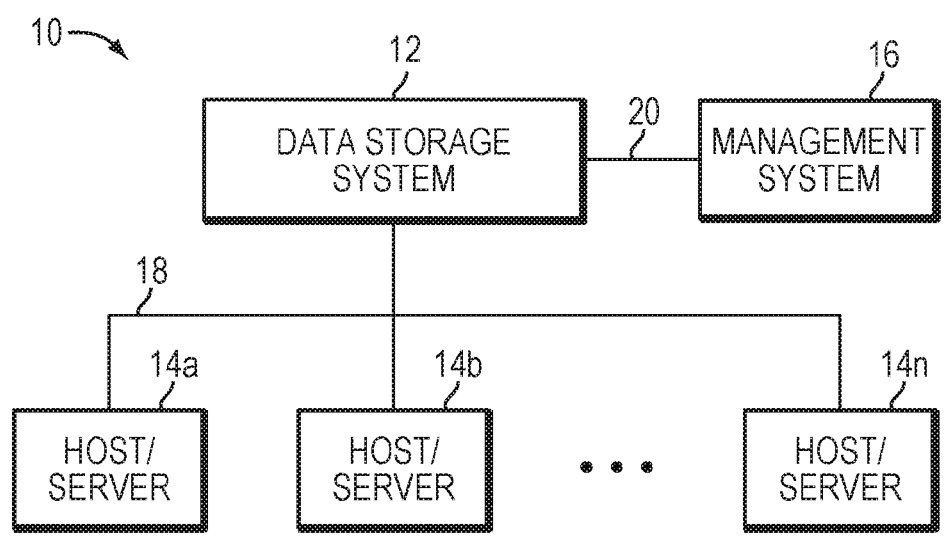
FIGS. 1-2 are examples of an embodiment of a computer system that may utilize the techniques described herein.

Described below is a technique for use in managing data deduplication in storage systems, which technique may be used to provide, among other things, evaluating characteristics of first and second storage tiers, wherein a first data object resides on the first storage tier and a second data object resides on the second storage tier, wherein the first and second data objects are selected for applying a deduplicating technique, wherein a data storage system includes the first and second storage tiers configured such that performance characteristics associated with the first storage tier is different from the second storage tier, and based on the evaluation, applying the deduplicating technique to the first and second data objects.

Data deduplication is a process by which a data storage system can detect multiple identical copies of data and only keep a single copy of that data, thus eliminating the redundant data by removing other copies of that data and thus improving storage utilization. Thus, the data deduplication process has the ability to detect common blocks of data and maintain a single copy of the common blocks, thereby increasing the efficiency of storage devices by storing data in a reduced number of physical blocks. In at least some systems, data deduplication requires iterating over set of data blocks in one or more storage extents of a deduplication domain by processing digest information associated with each data block, finding the data blocks that contain identical information, and mapping the identical data blocks to a single copy of the data. Thus, in a deduplicated system, a single data block may represent a large number such as hundreds of deduplicated data blocks such that each deduplicated data block refers to the single data block stored on a storage device (e.g. a disk). In such systems, an index table of unique digests is created to find commonality among the data set. The size of this index table determines a window of deduplication opportunity. The larger the index table, the more blocks can be checked for duplicates, and thus the larger the opportunity for deduplication.

Generally, data deduplication for feature software requires that data blocks in a storage extent be iterated through based on a specific iteration scheme. A set of storage extents that are deduplicated together form a deduplication domain. During iteration of a deduplication domain, an index table of unique digests is created from data blocks that are iterated through. Further, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Thus, deduplication maps data blocks that contain identical information to a single copy of the data thereby consolidating I/O operations directed to the identical data blocks to the single copy of the data. Thus, a deduplicated data block may replace identical copies of one or more data blocks thereby increasing the number of references to the deduplicated data block. A data block which is accessed by multiple references may also be known as a hot data block.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. Further, both a storage tier and a pool may have storage devices of different performance capabilities and costs. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier. Further, a tiered storage pool may include storage with different performance characteristics such that a logical unit created from storage space provisioned from the storage pool may include slices from different storage tiers with different performance characteristics.

In a conventional deduplication system, if a matching digest for a data block is found in an index table, the data block is deduplicated to an identical data block associated with the matching digest found in the index table by simply selecting one data block as a master deduplicated copy, updating the mapping of the other identical data block to point to the selected data block, and freeing storage space associated with the identical data block. Thus, in such a conventional system, the conventional technique of deciding which data block to preserve as a deduplicated block is non-deterministic and a data block may simply be selected for example based on an order in which data blocks are identified. Thus, in such a conventional system, based on the order in which addresses of data block and identical data block are aligned with respect to each other, either the address mapping information of the data block is updated to point to the identical data block found using the index table or the address mapping information of the identical data block found using the index table is updated to point to the data block.

Further, in such a conventional system, when a deduplicating technique is applied in a tiered storage pool, data blocks identified for deduplication may reside in different storage tiers having different performance capabilities. In such a conventional system, a conventional deduplicating technique does not take into account characteristics of physical storage on which data blocks that have been identified for deduplication reside. As a result, in such a conventional system, a data block residing in a low (also referred to herein as "cold") storage tier may be preserved by deduplicating identical copies of data blocks residing in a high (also referred to herein as "hot") storage tier to the data block of the cold storage tier. Thus, for example, in such a conventional system, if a data block residing on a high storage tier (e.g., a flash storage) is identified for deduplication and an identical data block is found using an index table where the identical data block resides on a low storage tier, the data block of flash storage may be deduplicated to the identical data block of the low storage tier such that the mapping of the data object is updated to point to the identical data block and storage space associated with the data block is freed. As a result, in such a conventional system, I/O operations directed to the data block previously residing on flash storage are now redirected to the identical data block residing on the low storage tier thereby reducing I/O performance of a host system in communication with a data storage system. Further, in such a conventional system, I/O performance may be reduced by mapping data residing on a high storage tier to a low storage tier without a user having any knowledge of such a change in mapping. Further, in such a conventional system, when a data object residing on a high storage tier is mapped to a data block residing on a low storage tier during deduplication, subsequent I/O operations directed to the deduplicated data may result in pre-fetching the deduplicated data from the low storage tier to the high storage tier thereby increasing the number of background I/O operations required for a pre-fetching operation. Further, in such a conventional system, when a data object residing on a high storage tier is mapped to a data block residing on a low storage tier during deduplication, holes created in the high storage tier when storage space associated with the data block is freed may result into background activity which tries to allocate objects from the freed storage space thereby increasing the number of I/O operations to the high storage tier.

By contrast, in at least some implementations in accordance with the technique as described herein, the current technique evaluates characteristics of storage space on which data that has been identified for deduplication resides. In at least some implementations in accordance with the technique as described herein, the type of storage tier on which data objects that have been identified for deduplication resides is evaluated, and based on the evaluation, the data blocks are mapped during deduplication. Thus, in at least one embodiment of the current technique, when data objects are identified for deduplication, storage tiers on which the data objects reside are taken into consideration during deduplication such that a data object residing on a highest storage tier is selected as a master copy, mapping of rest of the data blocks residing on lower storage tiers are updated to point to the master copy, and storage space associated with data blocks residing on the lower storage tiers is freed thereby preserving data residing on a high storage tiers (e.g., flash storage).

In at least some implementations in accordance with the technique as described herein, the use of the managing data deduplication in storage systems based on storage space characteristics technique can provide one or more of the following advantages: lowering costs by improving deduplication efficiency, improving memory utilization by evaluating characteristics of physical storage (e.g., storage tier, drive type, disk type) on which data objects selected for deduplication reside on, improving I/O performance of a system by deduplicating data blocks residing on a low storage tier to an identical copy of the data block residing on a high storage tier, reducing and/or eliminating I/O operations associated with pre-fetching data into flash storage by preserving data residing in the flash storage, reducing and/or eliminating background I/O operations associated with filling holes created by freeing data objects residing on a high storage tier during deduplication, and improving I/O performance by using data residing on a high storage tier as a master copy during deduplication.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
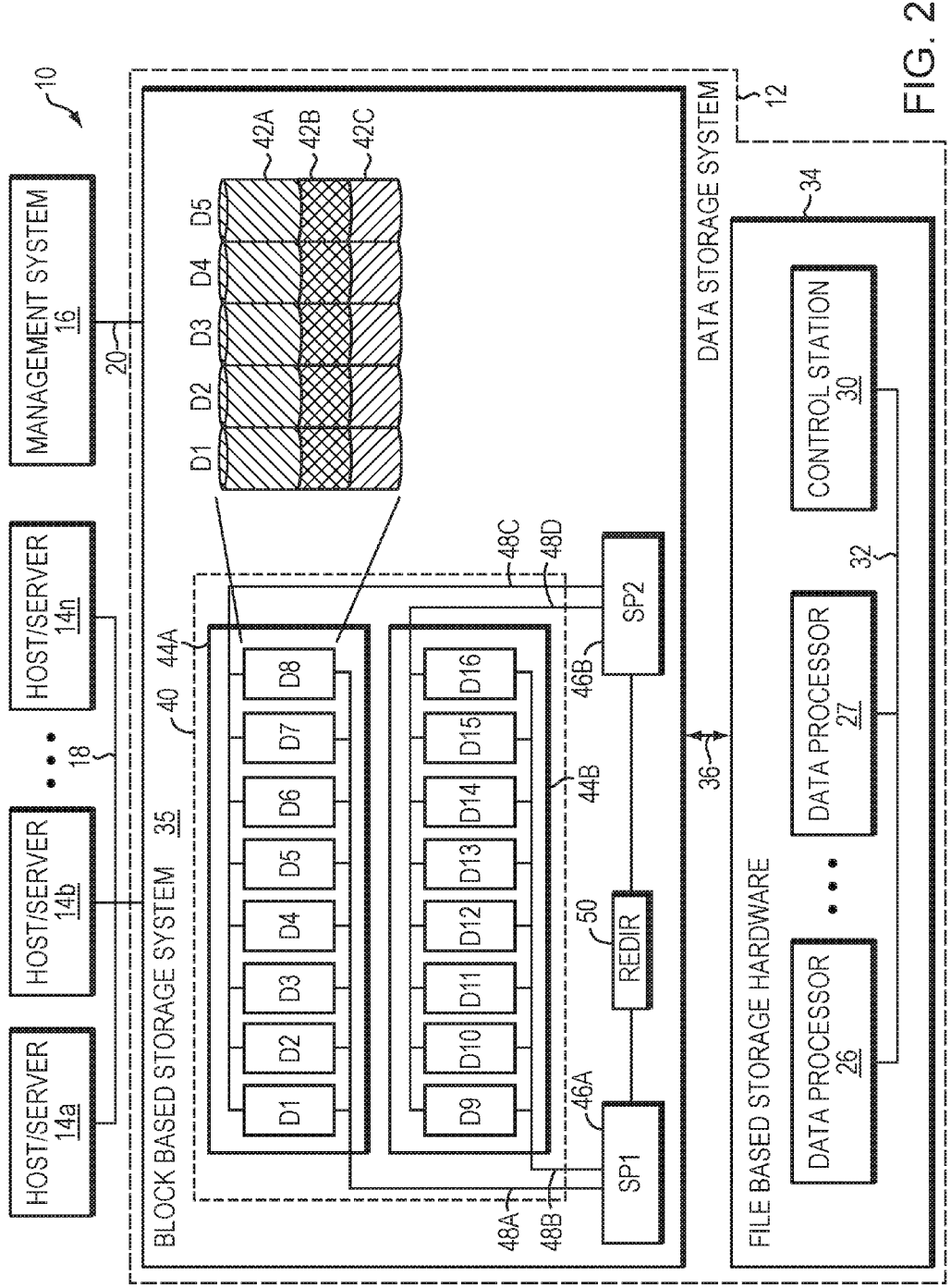

Referring now to FIG. 2, shown is an example of an embodiment of a computer system such as a unified data storage system that may be used in connection with performing the technique or techniques described herein. As shown, the unified data storage system 12 includes a block based storage system 35 and file based storage hardware 34. While the block based storage system 35 may be configured in a variety of ways, in at least one embodiment, the block based storage system 35 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 35.

The computer system 10 includes one or more block based data storage systems 35 connected to host systems 14a-14n through communication medium 18. The system 10 also includes a management system 16 connected to one or more block based data storage systems 35 through communication medium 20. In this embodiment of the computer system 10, the management system 16, and the N servers or hosts 14a-14n may access the block based data storage systems 35, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 35, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 35 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 35 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 35 includes two shelves, Shelf1 44A and Shelf2 44B; Shelf1 44A contains eight storage devices, D1-D8, and Shelf2 also contains eight storage devices, D9-D16.

Block based data storage system 35 may include one or more storage processors 46, for handling input/output (I/O) requests and allocations. Each storage processor 46 may communicate with storage devices 40 through one or more data buses 48. In at least one embodiment, block based data storage system 35 contains two storage processors, SP1 46A, and SP2 46B in communication with each other using redirector ("REDIR") 50, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 35, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 12 includes a file based storage hardware 34 that includes at least one data processor 26. The data processor 26, for example, may be a commodity computer. The data processor 26 sends storage access requests through physical data link 36 between the data processor 26 and the block based storage system 35. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 35. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 35, causes the control station 30 to detect the automated nature of a file based storage hardware installation process and access the data processor 26 over a private internal management network and execute the file based hardware installation process.

Figure 3:
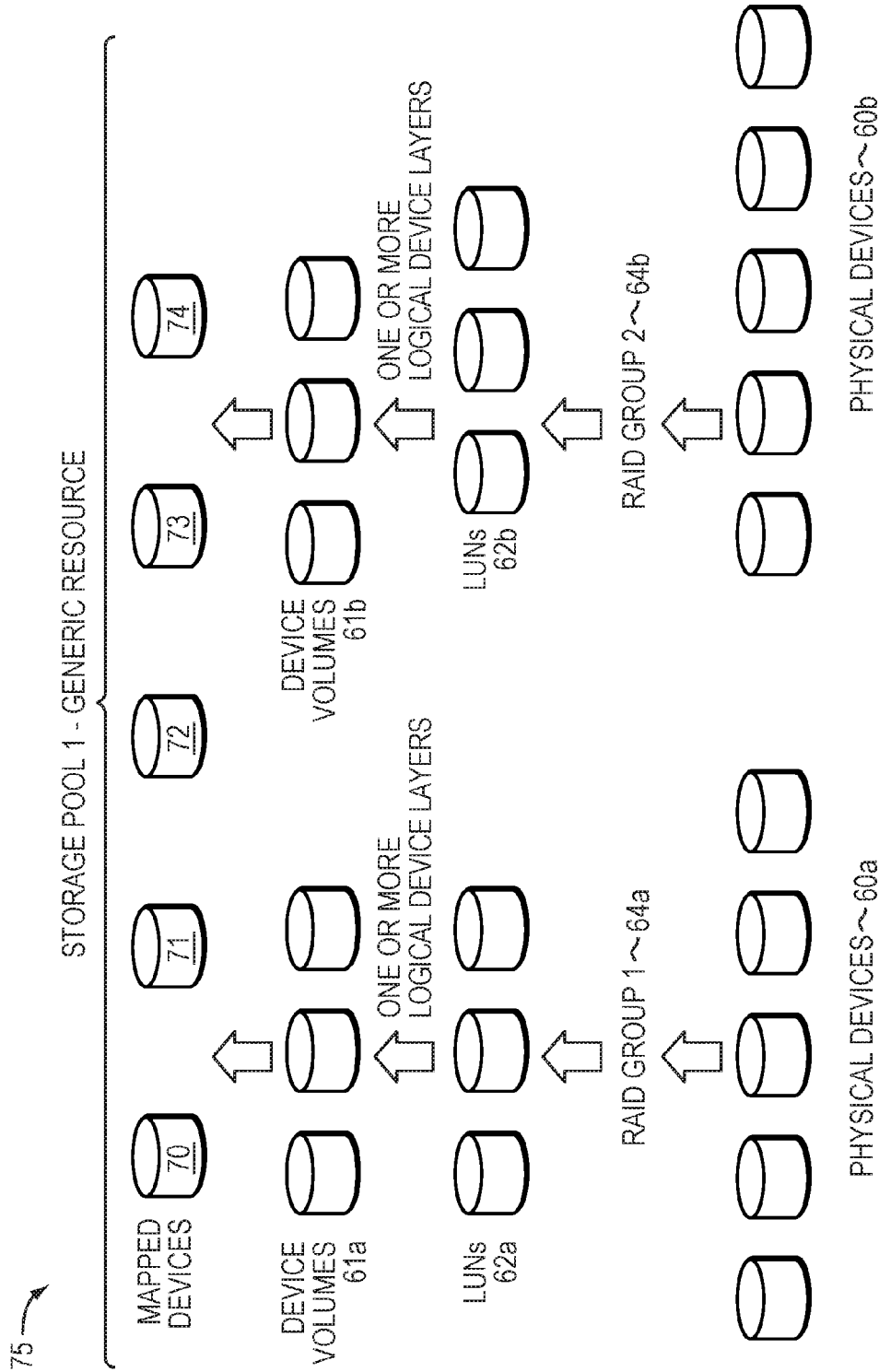
FIG. 3 is an example illustrating storage device layout.

FIG. 3 illustrates one of the many ways of constructing storage extents 75 from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consists of a set of storage extents which includes a set of deduplicated LUNs sharing a common set of blocks.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
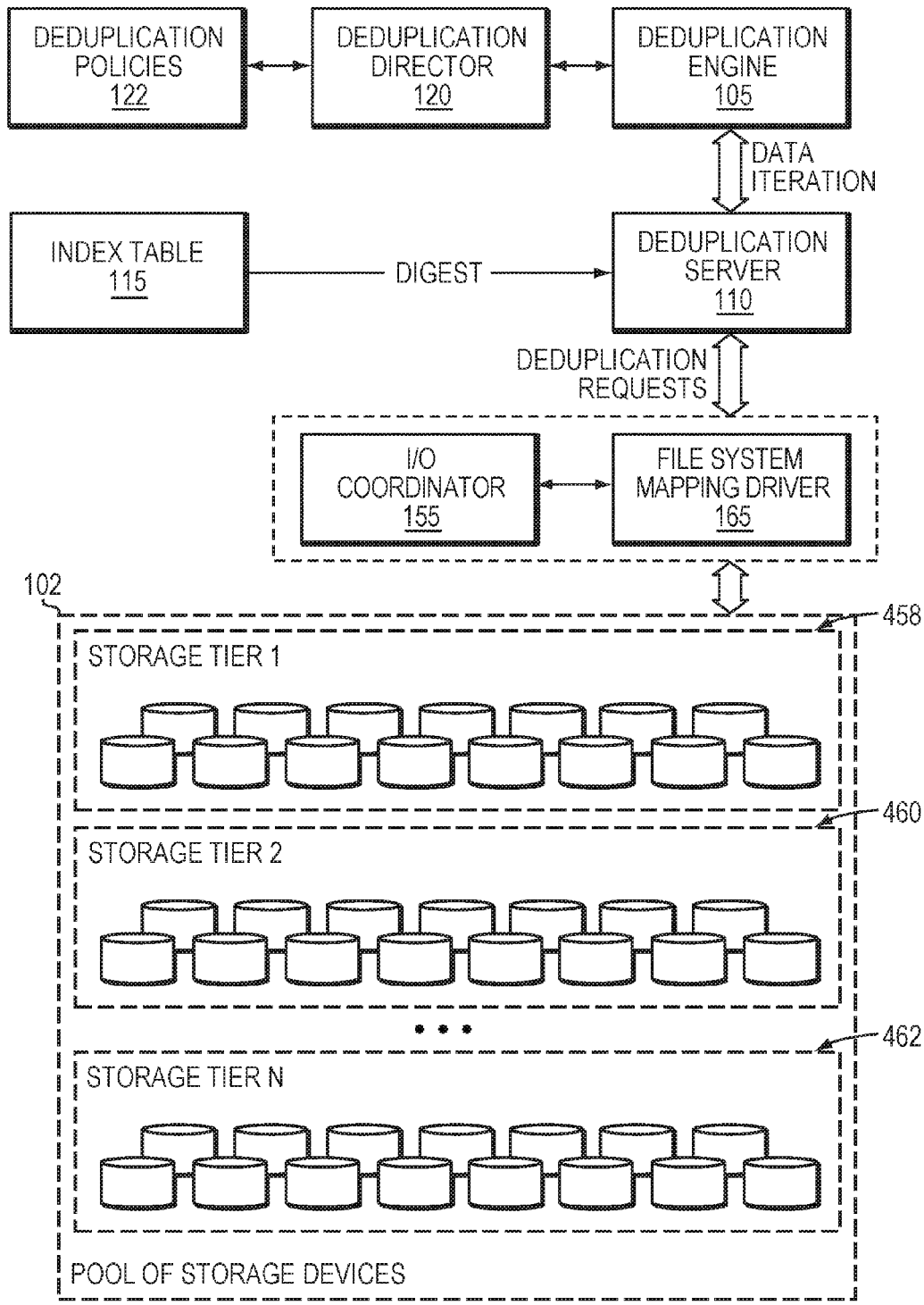
FIG. 4 is a diagram illustrating in more detail components that may be used in connection with techniques herein.

Referring to FIG. 4, shown is a more detailed representation of components that may be included in an embodiment using the techniques herein. With reference also to FIGS. 1-3, in a deduplication domain, each storage extent contains a set of storage tiers. For example, in FIG. 4, storage pool 102 may include one or more storage tiers 458, 460, 462 such that each storage tier has different performance characteristics. A goal of a deduplication process is to maintain only a single copy of each unique set of data. Software or other logic executing the deduplication process examines data in a deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block.

In at least one embodiment of the current technique, deduplication logic can be provided on data storage system 12. In an alternative embodiment, deduplication logic may be provided also or instead on a host system, such as host system 14. As described elsewhere herein, deduplication logic may be performed in a manner that is transparent to an application running on a host system. In at least one embodiment of the current technique, deduplication server 110 provides deduplication services in data storage system 12 by working in conjunction with I/O Coordinator 155 and File system mapping driver 165. I/O Coordinator 155 manages I/O operations in conjunction with the file system mapping driver 165. I/O Coordinator 155 provides framework for implementing digest and other I/O requests issued by the deduplication server 110. File system mapping driver 165 is a light-weight file system library that provides file system functionality and allows data storage system 12 to create files within a file system. File system mapping driver 165 processes I/Os directed to metadata of a file system and provides information regarding metadata (e.g., deduplication key, data block mapping information) of a data block that is potentially a candidate for deduplication.

In at least one embodiment of the current technique, deduplication director 120 is a process that iterates through deduplication domains including logical units and schedules data deduplication processes based on deduplication policies 122 to perform data deduplication. Further, deduplication director 120 works in conjunction with deduplication engine 105 to perform data deduplication on deduplication domain 130. Thus, deduplication director 120 is a component responsible for coordinating data deduplication operations. As a result, deduplication director 120 identifies data deduplication domains, manages storage space for performing data deduplication, and manages deduplication engine 105 to process each data deduplication domain.

Further, data deduplication engine 105 executes a deduplication job by performing data deduplication on a deduplication domain by iterating through data blocks of the deduplication domain, obtaining digests for the data blocks, identifying deduplication candidates, and issuing deduplication requests to deduplication server 110.

In at least one embodiment of the current technique, deduplication server 110 is a component that provides services to deduplication director 120 to iterate over sets of data in a set of deduplication domain 130. Deduplication server 110 also computes digests and remaps blocks after the deduplication technique is applied to remove duplicate blocks of data. A deduplication database (e.g. an index table) is maintained for a deduplication domain. Deduplication engine 105 communicates with the deduplication server 110 to iterate through the set of deduplication domain 130 and computes digests for data blocks that are iterated through. A digest is created for each chunk of data (e.g., a data block) that is identified as a candidate for deduplication. Deduplication engine 105 detects potential duplicate copies of data and issues a request to the deduplication server 110 to deduplicate the data based on a deduplication policy. One such deduplication policy may be deduplicating data based on characteristics of storage space on which data resides.

The deduplication database is stored on one of the storage extents that include one or more LUNs. An index table 115 may also be maintained on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during deduplication processing.

During deduplication processing as described herein, deduplication server 110 provides services to deduplication engine 105 by interacting with I/O coordinator 155 and file system mapping driver 165. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of file system mapping driver 165. A file system allows dynamic manipulation of the address maps that connects LUN's logical address space to its physical address space. The file system also allows mapping a single block of storage at multiple locations within the file system, and allows handling of writes to shared blocks by allocating new storage and updating the shared address mappings. I/O coordinator 155 manages I/O operations in conjunction with the file system mapping driver 165. I/O coordinator 155 provides framework for implementing digest and other I/O requests issued by the deduplication server 110.

Thus, deduplication engine 105 and deduplication server 110 working in conjunction with one another identify data blocks for deduplication, compare data digest information of the data blocks, identify candidate data blocks for deduplication, issue deduplication requests based on a deduplication policy (e.g., characteristics of storage space on which candidate data blocks reside), and maintain index table 115. Further, I/O coordinator 155 and file system mapping driver 165 working in conjunction with one another process deduplication requests received from deduplication server 110. File system mapping driver 165 performs a deduplication operation by freeing up redundant instances of a deduplicated data block.

In at least one embodiment of the current technique, deduplication engine 105 and deduplication server 110 working in conjunction with one another identify data blocks for deduplication. Further, in at least one embodiment of the current technique, when data blocks identified for deduplication are read from physical storage to determine whether contents of the data blocks are identical, characteristics of storage space on which the data blocks reside are gathered and evaluated based on a deduplication policy. Further, in such a case, the characteristics of storage space on which the data blocks reside (e.g., information regarding storage tiers on which the data blocks reside) may be communicated to file system mapping driver 165 which updates mapping information of the data blocks in such a way that a data block residing on a high storage tier is used for deduplicating other identical instances of the data block.

It should be noted that a set of deduplication policies may be initialized and selected by a data storage system. Further, it should be noted that a set of deduplication policies may be selected by a user of a data storage system.

Figure 5:
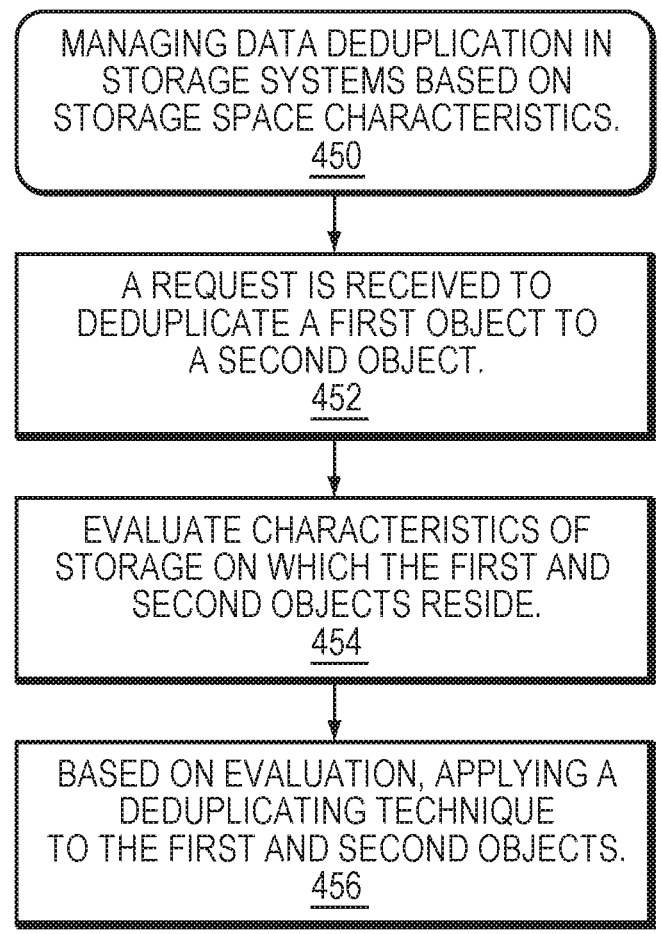
FIG. 5 is a flow diagram illustrating processes that may be used in connection with techniques herein.

Referring to FIG. 5, shown is a flow diagram illustrating a flow of data in the data storage system. With reference also to FIGS. 1-4, data deduplication is managed in a storage system based on storage space characteristics (step 450). A request is received to deduplicate a data object to another data object (step 452). Characteristics of storage space on which the data object and the other data object reside are evaluated (step 454). Based on the evaluation of the characteristics of storage space, a deduplicating technique is applied to both data objects such that the data object residing on a low storage tier is deduplicated to the data object residing on a high storage tier in such a way that the mapping of the data object residing on the low storage tier is updated to point to the data object residing on the high storage tier (step 456).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data deduplication in storage systems based on storage space characteristics, the method comprising:
   receiving a request to deduplicate a data object;
   identifying a candidate data object for deduplicating the data object;
   evaluating characteristics of storage tiers on which the data object and the candidate data object reside, wherein the data object resides on a first storage tier and the candidate data object resides on a second storage tier, wherein a data storage system includes the first storage tier and the second storage tier configured such that performance characteristics associated with the first storage tier are different from performance characteristics associated with the second storage tier; and
   based on the evaluating, selecting a master deduplicated copy from a group consisting of the data object and the candidate data object, wherein the data object is selected as the master deduplicated copy upon determining that performance characteristics associated with the first storage tier are higher than performance characteristics associated with the second storage tier, wherein the candidate data object is selected as the master deduplicated copy upon determining that performance characteristics associated with the second storage tier are higher than performance characteristics associated with the first storage tier; and
   based on the selecting, applying a deduplicating technique to the data object and the candidate data object, wherein the data object is deduplicated to the candidate data object by updating mapping information of the data object to point to the candidate data object upon selection of the candidate data object as the master deduplicated copy, wherein the candidate data object is deduplicated to the data object by updating mapping information of the candidate data object to point to the data object upon selection of the data object as the master deduplicated copy.

2. The method of claim 1, wherein evaluating characteristics of the first and second storage tiers further comprises:
   comparing performance characteristics of the first and second storage tiers.

3. The method of claim 1, wherein the data object and the candidate data object are selected from the group consisting of a deduplication domain, a storage extent, a Logical Unit Number (LUN), a file, a slice and a data block, wherein the data block is a fixed size chunk of a physical disk storage.

4. The method of claim 3, wherein a slice is a logical representation of a subset of physical disk storage.

5. The method of claim 1, wherein a storage tier includes a disk drive system comprising a plurality of Redundant Array of Inexpensive Disks (RAID) systems, each RAID system of the plurality of RAID systems having a first disk drive and a second disk drive.

6. The method of claim 3, wherein a deduplication domain comprises a set of storage extents, wherein each storage extent of the set of storage extents comprises a set of LUNs, wherein each LUN of the set of LUNs is a logical representation of a subset of physical disk storage.

7. The method of claim 1, wherein applying a deduplicating technique further comprises:
   based on the evaluating, updating mapping information of the data object and the candidate data object.

8. A system for use in managing data deduplication in storage systems based on storage space characteristics, the system comprising:
   first logic receiving a request to deduplicate a data object;
   second logic identifying a candidate data object for deduplicating the data object;
   third logic evaluating characteristics of storage tiers on which the data object and the candidate data object reside, wherein the data object resides on a first storage tier and the candidate data object resides on a second storage tier, wherein a data storage system includes the first storage tier and the second storage tier configured such that performance characteristics associated with the first storage tier are different from performance characteristics associated with the second storage tier;
   fourth logic selecting, based on the evaluating, a master deduplicated copy from a group consisting of the data object and the candidate data object, wherein the data object is selected as the master deduplicated copy upon determining that performance characteristics associated with the first storage tier are higher than performance characteristics associated with the second storage tier, wherein the candidate data object is selected as the master deduplicated copy upon determining that performance characteristics associated with the second storage tier are higher than performance characteristics associated with the first storage tier; and
   fifth logic applying, based on the selecting, a deduplicating technique to the data object and the candidate data object, wherein the data object is deduplicated to the candidate data object by updating mapping information of the data object to point to the candidate data object upon selection of the candidate data object as the master deduplicated copy, wherein the candidate data object is deduplicated to the data object by updating mapping information of the candidate data object to point to the data object upon selection of the data object as the master deduplicated copy.

9. The system of claim 8, wherein evaluating characteristics of the first and second storage tiers further comprises:
   sixth logic comparing performance characteristics of the first and second storage tiers.

10. The system of claim 8, wherein the data object and the candidate data object are selected from the group consisting of a deduplication domain, a storage extent, a Logical Unit Number (LUN), a file, a slice and a data block, wherein the data block is a fixed size chunk of a physical disk storage.

11. The system of claim 10, wherein a slice is a logical representation of a subset of physical disk storage.

12. The system of claim 8, wherein a storage tier includes a disk drive system comprising a plurality of Redundant Array of Inexpensive Disks (RAID) systems, each RAID system of the plurality of RAID systems having a first disk drive and a second disk drive.

13. The system of claim 10, wherein a deduplication domain comprises a set of storage extents, wherein each storage extent of the set of storage extents comprises a set of LUNs, wherein each LUN of the set of LUNs is a logical representation of a subset of physical disk storage.

14. The system of claim 8, wherein applying a deduplicating technique further comprises:

sixth logic updating, based on the evaluating, mapping information of the data object and the candidate data object.

* * * * *